(12) United States Patent
Tammi et al.

(10) Patent No.: US 7,567,796 B2
(45) Date of Patent: Jul. 28, 2009

(54) SYSTEM AND METHOD OF REGISTERING SUBSCRIPTION CHARACTERISTICS USING USER IDENTITIES

(75) Inventors: Kalle Tammi, Nokia (FI); Minna Myllymaki, Tampere (FI); Mikko Aittola, Vammala (FI); Anu H Leinonen, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/151,291

(22) Filed: Jun. 14, 2005

(65) Prior Publication Data
US 2006/0178132 A1 Aug. 10, 2006

(30) Foreign Application Priority Data
Feb. 4, 2005 (GB) ................. 0502383.3

(51) Int. Cl.
*H04M 3/16* (2006.01)
(52) U.S. Cl. ..................... 455/411; 455/435.1
(58) Field of Classification Search ............. 455/406, 455/410, 411, 412.1, 412.2, 414.1, 415, 432.3, 455/433, 435.1; 713/157, 171
See application file for complete search history.

(56) References Cited

U.S. PATENT DOCUMENTS

| | | | |
|---|---|---|---|
| 2002/0023213 A1* | 2/2002 | Walker et al. ............... 713/168 |
| 2003/0115457 A1* | 6/2003 | Wildish et al. .............. 713/157 |
| 2004/0196796 A1 | 10/2004 | Bajko et al. |
| 2005/0124341 A1* | 6/2005 | Myllymaki et al. ....... 455/435.1 |
| 2005/0289347 A1* | 12/2005 | Ovadia ........................ 713/171 |
| 2006/0046692 A1* | 3/2006 | Jelinek et al. ............... 455/411 |
| 2006/0089140 A1* | 4/2006 | Zhang ...................... 455/432.1 |

FOREIGN PATENT DOCUMENTS

| | | |
|---|---|---|
| WO | WO 03/005669 | 1/2003 |
| WO | WO 03/081876 | 10/2003 |

OTHER PUBLICATIONS

3GPP—ETSI TS 129 228 (V6.5.0) -, "Digital cellular telecommunications system (Phase 2+); Universal Mobile Telecommunications System (UMTS); IP Multimedia (IM) Subsystem Cx and Dx Interfaces; Signalling flows and message contents (3GPP TS 29.228 version 6.5.0 Release 6)", Dec. 2004, pp. 1-55.

* cited by examiner

*Primary Examiner*—Sam Bhattacharya
(74) *Attorney, Agent, or Firm*—Squire, Sanders & Dempsey, L.L.P.

(57) ABSTRACT

A method assists the registration of subscription characteristics in a communications system, wherein a private user identity characteristic can be paired with a public user identity characteristic and more than one private user identity may be associated with a subscription. The method includes transmitting, from a subscription information store entity of the system to a service provision entity of the system, a first message containing data specifying characteristics of a pairing of a first private user identity and a public user identity. The message also includes an indication of any further private user identities other than the first private user identity that are associated with the same subscription as the first private user identity.

30 Claims, 1 Drawing Sheet

SYSTEM AND METHOD OF REGISTERING SUBSCRIPTION CHARACTERISTICS USING USER IDENTITIES

BACKGROUND OF THE INVENTION

1. Field of the Invention

This invention relates to the registration of user identities in a communications system.

2. Description of the Related Art

FIG. 1 shows part of the architecture of the 3GPP system, including the IP Multimedia Subsystem (IMS) 1. The IMS includes a serving call session control function (S-CSCF) 2 which can communicate with a home subscriber server (HSS) 3 over a Cx-type interface. The system also includes one or more connection entities 4 such as packet switched domains or P-CSCFs by means of which the IMS 1 can communicate with user entities 5 such as mobile phones. The interface 6 between the S-CSCF 2 and the HSS 3 is a Cx-type interface, whose characteristics are tightly specified.

The general functionality of the units shown in FIG. 1 in a current 3G system is well-known. In particular, the S-CSCF provides services to the user entities and the HSS stores information on subscriptions which can be accessed by the S-CSCF and stored by it in a local database 7 for assisting the provision of services to users under that subscription.

The current specification for 3GPP Rel-6 TS 23.228 (version 6.7.0, chapter 4.3.3.4 FIG. 4.6) defines the IMS subscription, which may consist of multiple private user identities. The private user identities may be paired with dedicated or shared public user identities.

Currently the public user identity—private user identity pair is registered explicitly and it is assumed that the S-CSCF will find out about the pairing of a subscription's private user identities with the help of shared public user identity/identities when such are registered. In some situations this can work satisfactorily. However, the private user identities may have also dedicated public user identities, which may be registered independently of the shared public user identities. It has been identified that when this happens under the current design the S-CSCF has no means of finding out that parings of a registered public user identity with a private user identity belong to the same IMS subscription.

There is therefore a need for a means of enabling the S-CSCF to find out about such pairings.

WO 2004/000089 (US 2004/0196796) addresses problems associated with an HSS linking multiple user identities to the same subscriber. Such identities must be registered at the same S-CSCF and accordingly the HSS does not give server capabilities for the second and further registrations, but instead gives the name of the already used S-CSCF.

SUMMARY OF THE INVENTION

According to one aspect of the present invention there is provided a method for assisting the registration of subscription characteristics in a communications system in which a private user identity characteristic can be paired with a public user identity characteristic and more than one private user identity may be associated with a subscription; the method comprising transmitting from a subscription information store entity of the system to a service provision entity of the system a first message containing data specifying characteristics of a pairing of a first private user identity and a public user identity, the message also including an indication of any further private user identities other than the first private user identity that are associated with the same subscription as the first private user identity.

Further aspects and preferred features of the invention are set out in the accompanying claims.

The present invention will now be described by way of example with reference to the accompanying drawing.

DETAILED DESCRIPTION OF THE PREFERRED EMBODIMENTS

Figure 1:
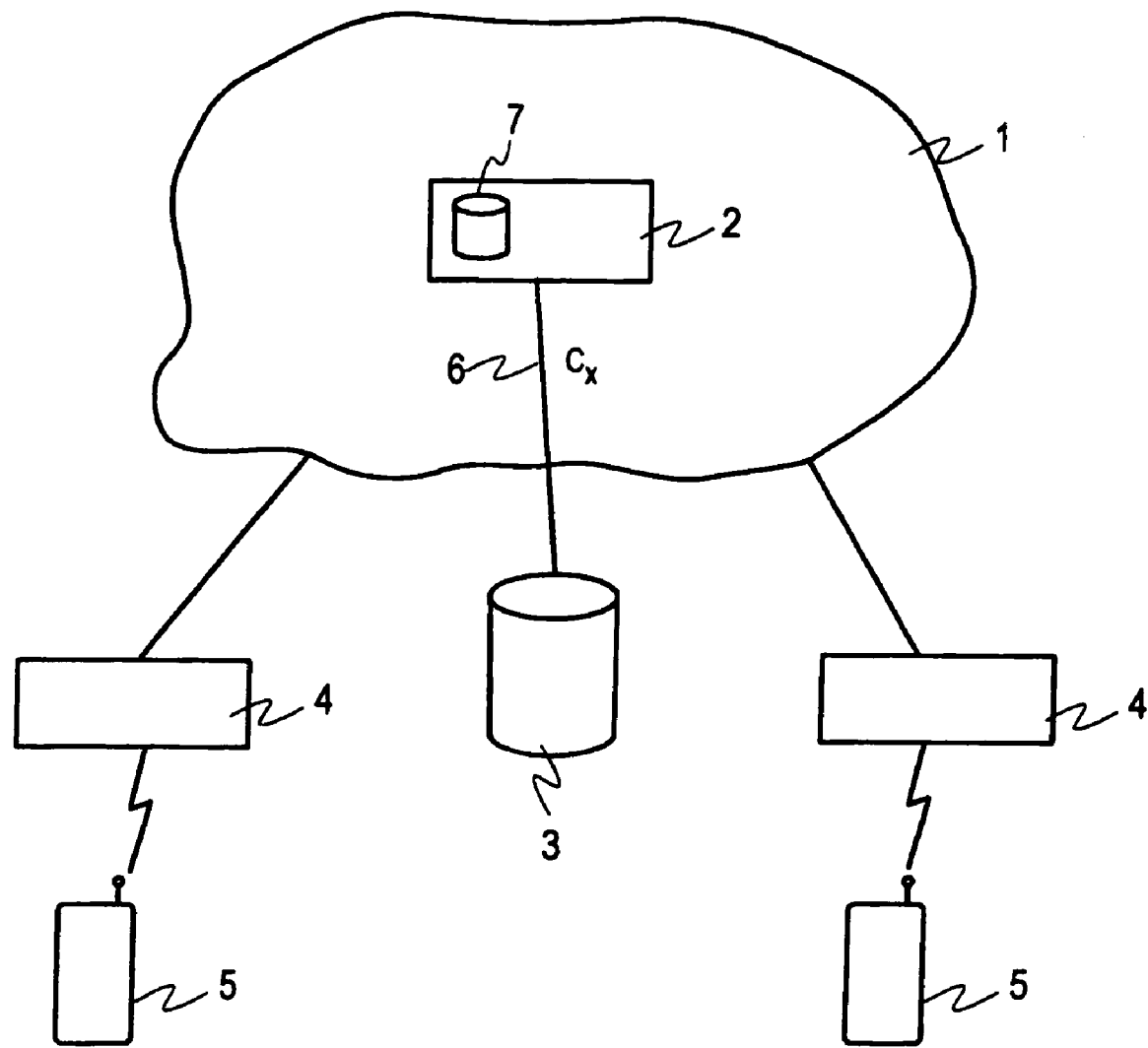
FIG. 1 shows a communications system.

In summary, this example of the present invention involves the introduction of a new attribute to the Cx interface. This attribute has features that allow it to support IMS subscriptions with multiple private user identities.

As will be explained in more detail below, in this example of the invention a new attribute is added to the Cx interface. This attribute is referred to herein as an Associated-Identities attribute. The attribute is capable of carrying sufficient information to inform as S-CSCF of private identities of the IMS subscription to the S-CSCF during the registration of a private user identity—public identity pair and when a new private user identity is added into the subscription.

When a user registers a private user identity—public user identity pair in the IMS, the S-CSCF retrieves the authentication data and user data related to the identity pair from the HSS via the Cx interface. The commands used for this is are Multimedia-Auth-Request (MAR) and Server-Assignment-Request (SAR). The HSS returns the authentication data in the Multimedia-Auth-Answer (MAA) and the user data in the Server-Assignment-Answer (SAA) message.

If the private identity—public identity pair belongs to a IMS subscription which contains more private identities, the HSS adds a list of the subscription's other private user identities into the SAA. To do this it uses the Associated-Identities attribute-value pair (AVP). The Associated-Identities AVP is known by the units that use the Cx interface as containing a list of User-Name AVPs, which each contain a private user identity.

Using the conventional format for 3GPP messages, the SAA message is defined as follows:

```
<Server-Assignment-Answer> ::= < Diameter Header: 301, PXY,
16777216 >
                < Session-Id >
                {Vendor-Specific-Application-Id}
                [ Result-Code ]
                [Experimental-Result ]
                { Auth-Session-State }
                { Origin-Host }
                { Origin-Realm }
                [ User-Name ]
                *[ Supported-Features ]
                [ User-Data ]
                [ Charging-Information ]
                *[ Proxy-Info ]
                *[ Route-Record ]
                [ Associated-Identities ]
                *[ AVP ]
``` and the Associated-Identities field is defined as follows:

```
Associated-Identities ::= <AVP header: xxx>
                         *[User-Name]
                         *[AVP]
```

The term "xxx" indicates a number, which can be selected to comply with the requirements of the system.

Based on the associated private user identities that it receives the S-CSCF is able to learn the IMS subscription's private user identities before carrying out further actions, and pre-store them into its database.

If a new private user identity is added into the IMS subscription in the HSS, the HSS informs the S-CSCF by sending a Push-Profile-Request (PPR) to the S-CSCF. The PPR contains as a key any of the private user identities that the S-CSCF already posses and the updated list of the associated private user identities in the Associated-Identities AVP. The AVP contains also the new private user identity. The S-CSCF identifies that it does so and stores the new identity in its database.

The format of the push-profile request message is as follows:

```
< Push-Profile-Request > ::= < Diameter Header: 305, REQ, PXY,
16777216 >
      < Session-Id >
      { Vendor-Specific-Application-Id }
      { Auth-Session-State }
      { Origin-Host }
      { Origin-Realm }
      { Destination-Host }
      { Destination-Realm }
      { User-Name }
      *[ Supported-Features ]
      [ User-Data ]
      [ Charging-Information ]
      *[ Proxy-Info ]
      *[ Route-Record ]
      [ Associated-Identities ]
      *[ AVP ]
```

If an existing private user identity is deleted from a subscription, the HSS utilises a Registration-Termination-Request (RTR) message to inform the S-CSCF. The basis of a message is currently specified in the 3GPP standards. However, at present the RTR may contain only one private identity (i.e. User-Name AVP) at a time. The present inventors have identified that the efficiency with which the RTR message is used may be improved by additionally including the Associated-Identities AVP in the RTR command. According to this enhancement, the RTR command would have the following format:

```
<Registration-Termination-Requst> ::=< Diameter Header: 304,
16777216, REQ >
                      < Session-Id >
                      { Vendor-Specific-Application-Id }
                      { Auth-Session-State }
                      { Origin-Host }
                      { Origin-Realm }
                      { Destination-Host }
                      { Destination-Realm }
                      { User-Name }
                      *[ Supported-Features ]
                      *[ Public-Identity ]
                      { Deregistration-Reason }
```

```
                      [ Associated-Identities ]
                      *[ Proxy-Info ]
                      *[ Route-Record ]
                      *[ AVP ]
```

The following is a list of 3GPP AVP codes suitable for implementing the features described above in conjunction with other features of the 3GPP system.

TABLE 7.1

3GPP specific AVP codes

| AVP Code | Attribute Name | Data Type | Specified in the 3GPP TS |
|---|---|---|---|
| 500 | Abort-Cause | Enumerated | 29.209 [8] |
| 501 | Access-Network-Charging-Address | Address | |
| 502 | Access-Network-Charging-Identifier | Grouped | |
| 503 | Access-Network-Charging-Identifier-Value | OctetString | |
| 504 | AF-Application-Identifier | OctetString | |
| 505 | AF-Charging-Identifier | OctetString | |
| 506 | Authorization-Token | OctetString | |
| 507 | Flow-Description | IPFilterRule | |
| 508 | Flow-Grouping | Grouped | |
| 509 | Flow-Number | Unsigned32 | |
| 510 | Flows | Grouped | |
| 511 | Flow-Status | Enumerated | |
| 512 | Flow-Usage | Enumerated | |
| 513 | Gq-Specific-Action | Enumerated | |
| 514 | Max-Requested-Bandwidth | Unsigned32 | |
| 515 | Max-Requested-Bandwidth-DL | Unsigned32 | |
| 516 | Max-Requested-Bandwidth-UL | Unsigned32 | |
| 517 | Media-Component-Description | Grouped | |
| 518 | Media-Component-Number | Unsigned32 | |
| 519 | Media-Sub-Component AVP | Grouped | |
| 520 | Media-Type | Enumerated | |
| 521 | RR-Bandwidth | Unsigned32 | |
| 522 | RS-Bandwidth | Unsigned32 | |
| 523 | SIP-Forking-Indication | Enumerated | |
| 600 | Visited-Network-Identifier | OctetString | 29.229 [2] |
| 601 | Public-Identity | UTF8String | |
| 602 | Server-Name | UTF8String | |
| 603 | Server-Capabilities | Grouped | |
| 604 | Mandatory-Capability | Unsigned32 | |
| 605 | Optional-Capability | Unsigned32 | |
| 606 | User-Data | OctetString | |
| 607 | SIP-Number-Auth-Items | Unsigned32 | |
| 608 | SIP-Authentication-Scheme | UTF8String | |
| 609 | SIP-Authenticate | OctetString | |
| 610 | SIP-Authorization | OctetString | |
| 611 | SIP-Authentication-Context | OctetString | |
| 612 | SIP-Auth-Data-Item | Grouped | |
| 613 | SIP-Item-Number | Unsigned32 | |
| 614 | Server-Assignment-Type | Enumerated | |
| 615 | Deregistration-Reason | Grouped | |
| 616 | Reason-Code | Enumerated | |
| 617 | Reason-Info | UTF8String | |
| 618 | Charging-Information | Grouped | |
| 619 | Primary-Event-Charging-Function-Name | DiameterURI | |
| 620 | Secondary-Event-Charging-Function-Name | DiameterURI | |
| 621 | Primary-Charging-Collection-Function-Name | DiameterURI | |
| 622 | Secondary-Charging-Collection-Function-Name | DiameterURI | |
| 623 | User-Authorization-Type | Enumerated | |
| 624 | User-Data-Already-Available | Enumerated | |
| 625 | Confidentiality-Key | OctetString | |
| 626 | Integrity-Key | OctetString | |
| 627 | User-Data-Request-Type | Enumerated | |
| 628 | Supported-Features | Grouped | |
| 629 | Feature-List-ID | Unsigned32 | |

TABLE 7.1-continued

3GPP specific AVP codes

| AVP Code | Attribute Name | Data Type | Specified in the 3GPP TS |
|---|---|---|---|
| 630 | Feature-List | Unsigned32 | |
| 631 | Supported-Applications | Grouped | |
| 632 | Associated-Identities | Grouped | |
| 700 | User-Identity | Grouped | 29.329 [4] |
| 701 | MSISDN | OctetString | |
| 702 | User-Data | OctetString | |
| 703 | Data-Reference | Enumerated | |
| 704 | Service-Indication | OctetString | |
| 705 | Subs-Req-Type | Enumerated | |
| 706 | Requested-Domain | Enumerated | |
| 707 | Current-Location | Enumerated | |
| 708 | Identity-Set | Enumerated | |
| | | | 32.299 [5] |
| | | | 29.061 [13] |
| | | | 29.210 [15] |

Note:
The AVP codes from 1 to 255 are reserved for backwards compatibility with 3 GPP RADIUS Vendor Specific Attributes (See TS 29.061 [13])
The AVP codes from 256 to 299 are reserved for future use.
The AVP codes from 300 to 399 are reserved for TS 29.234
The AVP codes from 400 to 499 are reserved for TS 29.109
The AVP codes from 524 to 599 are reserved for TS 29.209
The AVP codes from 633 to 699 are reserved for TS 29.229.
The AVP codes from 709 to 799 are reserved for TS 29.329.
The AVP codes from 800 to 899 are reserved for TS 32.299
The AVP codes from 900 to 999 are reserved for TS 29.061
The AVP codes from 1000 to 1099 are reserved for TS 29.210

The following is a description of a S-CSCF registration/deregistration notification procedure suitable for implementing the features described above in the 3GPP system.

This procedure is used between the S-CSCF and the HSS. The procedure is invoked by the S-CSCF, corresponds to the combination of the operations Cx-Put and Cx-Pull (see 3GPP TS 23.228 [1]) and is used:

To assign an S-CSCF to a Public User Identity, or to clear the name of the S-CSCF assigned to one or more Public User Identities.

To download from HSS the relevant user information that the S-CSCF needs to serve the user.

This procedure is mapped to the commands Server-Assignment-Request/Answer in the Diameter application specified in 3GPP TS 29.229 [5]. Tables 6.1.2.1 and 6.1.2.2 describe the involved information elements.

TABLE 6.1.2.1

S-CSCF registration/deregistration notification request

| Information element name | Mapping to Diameter AVP | Cat. | Description |
|---|---|---|---|
| Public User Identity (See 7.2) | Public-Identity | C | Public User Identity or list of Public User Identities. One and only one Public User Identity shall be present if the Server-Assignment-Type is any value other than TIMEOUT_DEREGISTRATION, USER_DEREGISTRATION or ADMINISTRATIVE_DEREGISTRATION. If Server-Assignment-Type indicates deregistration of some type and Private User Identity is not present in the request, at least one Public User Identity shall be present. |

TABLE 6.1.2.1-continued

S-CSCF registration/deregistration notification request

| Information element name | Mapping to Diameter AVP | Cat. | Description |
|---|---|---|---|
| S-CSCF Name (See 7.4) | Server-Name | M | Name of the S-CSCF. |
| Private User Identity (See 7.3) | User-Name | C | Private User Identity. It shall be present if it is available when the S-CSCF issues the request. It may be absent during the initiation of a session to an unregistered user. In such situation, Server-Assignment-Type shall contain the value UNREGISTERED_USER. In case of de-registration, Server-Assignment-Type equal to TIMEOUT_DEREGISTRATION, USER_DEREGISTRATION or ADMINISTRATIVE_DEREGISTRATION, if no Public User Identity AVPs are present then Private User Identity shall be present. |
| Server Assignment Type (See 7.8) | Server-Assignment-Type | M | Type of update the S-CSCF requests in the HSS (e.g.: de-registration). See 3GPP TS 29.229 [5] for all the possible values. |
| User Data Already Available (See 7.16) | User-Data-Already-Available | M | This indicates if the user profile is already available in the S-CSCF. In the case where Server-Assignment-Type is not equal to NO_ASSIGNMENT, REGISTRATION, RE_REGISTRATION or UNREGISTERED_USER, the HSS shall not use User Data Already Available when processing the request. |
| Routing Information (See 7.13) | Destination-Host | C | If the S-CSCF knows the HSS name, the Destination-Host AVP shall be present in the command. This information is available if the request belongs to an already existing registration, e.g. in case of the re-registration, where the HSS name is stored in the S-CSCF. The HSS name is obtained from the Origin-Host AVP, which is received from the HSS, e.g. included in the MAA command. This information may not be available if the command is sent as a consequence of a session termination for an unregistered user. In this case the Destination-Host AVP is not present and the command is routed to the next Diameter node, e.g. SLF, based on the Diameter routing table in the S-CSCF. |

TABLE 6.1.2.2

S-CSCF registration/deregistration notification response

| Information element name | Mapping to Diameter AVP | Cat. | Description |
|---|---|---|---|
| Private User Identity (See 7.3) | User-Name | C | Private User Identity. It shall be present if it is available when the HSS sends the response. It may be absent in the following error case: when the Server- |

TABLE 6.1.2.2-continued

S-CSCF registration/deregistration notification response

| Information element name | Mapping to Diameter AVP | Cat. | Description |
|---|---|---|---|
| Registration result (See 7.6) | Result-Code/ Experimental-Result | M | Result of registration. Result-Code AVP shall be used for errors defined in the Diameter Base Protocol. Experimental-Result AVP shall be used for Cx/Dx errors. This is a grouped AVP which contains the 3GPP Vendor ID in the Vendor-Id AVP, and the error code in the Experimental-Result-Code AVP. |
| User Profile (See 7.7) | User-Data | C | Relevant user profile. It shall be present when Server-Assignment-Type in the request is equal to NO_ASSIGNMENT, REGISTRATION, RE_REGISTRATION or UNREGISTERED_USER according to the rules defined in section 6.6. If the S-CSCF receives more data than it is prepared to accept, it shall perform the de-registration of the user with User-Authorization-Type set to DEREGISTRATION_TOO_MUCH_DATA and send back a SIP 3xx or 480 (Temporarily Unavailable) response, which shall trigger the selection of a new S-CSCF by the I-CSCF, as specified in 3GPP TS 24.229 [8]. |
| Charging Information (See 7.12) | Charging-Information | C | Addresses of the charging functions. It shall be present when the User-Data AVP is sent to the S-CSCF. When this parameter is included, the Primary Charging Collection Function address shall be included. All other elements shall be included if they are available. |
| Associated Private Identities | Associated-Identities | C | This AVP contains the private user identities, which belong to the same IMS subscription as the private user identity or public user identity received in the SAR command. If the IMS subscription contains only single private user identity, this AVP shall not be present. |

Detailed Behaviour

On registering/deregistering a Public User Identity the S-CSCF shall inform the HSS. The same procedure is used by the S-CSCF to get the user information which contains the user profile and the charging information. The relevant user profile downloaded is described in more detailed in sections 6.5.1 and 6.6. The HSS holds information about the state of registration of all the identities of the user. The S-CSCF uses this procedure to update such states. For implicitly registered identities, the rules defined in Section 6.5.1 shall apply. The HSS shall, in the following order (in case of an error in any of the steps the HSS shall stop processing and return the corresponding error code, see 3GPP TS 29.229 [5]):

1. Check that the user is known. If not Experimental-Result-Code shall be set to DIAMETER_ERROR_USER_UNKNOWN. If there is neither a Public User Identity nor a Private User Identity included, the Experimental-Result-Code shall be set to DIAMETER_MISSING_USER_ID.
2. The HSS may check whether the Private and Public User Identities received in the request belong to the same user. If not Experimental-Result-Code shall be set to DIAMETER_ERROR_IDENTITIES_DONT_MATCH.
3. Check the Server Assignment Type value received in the request:
   If it indicates REGISTRATION or RE_REGISTRATION, the HSS shall download the relevant user information. If the Public User Identity's authentication pending flag which is specific for the Private User Identity is set, the HSS shall clear it. The Result-Code shall be set to DIAMETER_SUCCESS and the HSS shall set the registration state of the Public User Identity as registered (if not already registered). If there are multiple private user identities, which belong to the served IMS subscription, the Associated-Identities AVP shall be added to the answer message and it shall contain all private user identities associated to the IMS subscription.
   Only one Public User Identity shall be present in the request. If more than one identity is present the Result-Code shall be set to DIAMETER_AVP_OCCURS_TOO_MANY_TIMES and no user information shall be returned. If there is no Public User Identity present, the Experimental-Result-Code shall be set to DIAMETER_MISSING_USER_ID.
   If it indicates UNREGISTERED_USER, the HSS shall store the S-CSCF name, set the registration state of the Public User Identity as unregistered, i.e. registered as a consequence of a terminating call and download the relevant user information. If there are multiple Private User Identities associated to the Public User Identity in the HSS, the HSS shall arbitrarily select one of the Private User Identities and put it into the response message. The Result-Code shall be set to DIAMETER_SUCCESS. If there are multiple private user identities, which belong to the served IMS subscription, the Associated-Identities AVP shall be added to the answer message and it shall contain all private user identities associated to the IMS subscription.
   Only one Public User Identity shall be present in the request. If more than one identity is present the Result-Code shall be set to DIAMETER_AVP_OCCURS_TOO_MANY_TIMES and the modifications specified in the previous paragraph shall not be performed. If there is no Public User Identity present, the Experimental-Result-Code shall be set to DIAMETER_MISSING_USER_ID.
   If it indicates TIMEOUT_DEREGISTRATION, USER_DEREGISTRATION, DEREGISTRATION_TOO_MUCH_DATA or ADMINISTRATIVE_DEREGISTRATION, the HSS shall clear the S-CSCF name associated to the Private User Identity for all the Public User Identities that the S-CSCF indicated in the request and set the registration state of the identities as not registered. If no Public User Identity is present in the request, the Private User Identity shall be present; in this case the HSS shall clear the S-CSCF name for all the Public User Identities associated to the Private User Identity and set their registration state to not registered. The Result-Code shall be set to DIAMETER_SUCCESS.

If it indicates TIMEOUT_DEREGISTRATION_STORE_SERVER_NAME or USER_DEREGISTRATION_STORE_SERVER_NAME the HSS decides whether to keep the S-CSCF name associated to the Private User Identity stored or not for all the Public User Identities that the S-CSCF indicated in the request. If no Public User Identity is present in the request, the Private User Identity shall be present. If the HSS decides to keep the S-CSCF name stored the HSS shall keeps the S-CSCF name stored for all the Public User Identities associated to the Private User Identity and set their registration state to unregistered. The Result-Code shall be set to DIAMETER_SUCCESS.

If the HSS decides not to keep the S-CSCF name the Experimental-Result-Code shall be set to DIAMETER_SUCCESS_SERVER_NAME_NOT_STORED. If the HSS received Public User Identities in the request, the HSS shall set the registration state to not registered for the Public User Identity(ies) that the S-CSCF indicated in the request. If the HSS received a Private User Identity in the request, the HSS shall set the registration state of all Public User Identities related to the private identity to not registered.

If it indicates NO_ASSIGNMENT, the HSS checks whether the user is assigned for the S-CSCF requesting the data and download the relevant user information. The Result-Code shall be set to DIAMETER_SUCCESS. If there are multiple private user identities, which belong to the served IMS subscription, the Associated-Identities AVP shall be added to the answer message and it shall contain all private user identities associated to the IMS subscription.

If the requesting S-CSCF is not the same as the assigned S-CSCF, the Result-Code shall be set to DIAMETER_ UNABLE_TO_COMPLY.

Only one Public User Identity shall be present in the request. If more than one Public User Identity is present the Result-Code shall be set to DIAMETER_AVP_OCCURS_TOO_MANY_TIMES and no user information shall be returned. If there is no Public User Identity present, the Experimental-Result-Code shall be set to DIAMETER_MISSING_USER_ID.

If it indicates AUTHENTICATION_FAILURE or AUTHENTICATION_TIMEOUT, the HSS shall clear the S-CSCF name for the Public User Identity associated to the Private User Identity that the S-CSCF indicated in the request and set the registration state of the identity as not registered. If the Public User Identity's authentication pending flag which is specific for the Private User Identity is set, the HSS shall clear it. The Result-Code shall be set to DIAMETER_SUCCESS.

Only one Public User Identity shall be present in the request. If more than one identity is present the Result-Code shall be set to DIAMETER_AVP_OCCURS_TOO_MANY_TIMES and the modifications specified in the previous paragraph shall not be performed. If there is no Public User Identity present, the Experimental-Result-Code shall be set to DIAMETER_MISSING_USER_ID.

If the HSS cannot fulfil the received request, e.g. due to database error, it shall set the Result-Code to DIAMETER_UNABLE_TO_COMPLY. The HSS shall not modify any user state nor download any user Public User Identity information to the S-CSCF.

See chapter 8.1.2 and 8.1.3 for the description of the handling of the error situations: reception of an S-CSCF name different from the one stored in the HSS and reception of a Server-Assignment-Type value not compatible with the registration state of the user.

The following is a description of an authentication procedure suitable for implementing the features described above in the 3GPP system.

This procedure is used between the S-CSCF and the HSS to exchange information to support the authentication between the end user and the home IMS network. The procedure is invoked by the S-CSCF, corresponds to the combination of the operations Cx-AV-Req and Cx-Put (see 3GPP TS 33.203 [3]) and is used:

To retrieve authentication vectors from the HSS.

To resolve synchronization failures between the sequence numbers in the UE and the HSS.

This procedure is mapped to the commands Multimedia-Auth-Request/Answer in the Diameter application specified in 3GPP TS 29.229 [5]. Tables 6.3.1-6.3.5 detail the involved information elements.

TABLE 6.3.1

Authentication request

| Information element name | Mapping to Diameter AVP | Cat. | Description |
| --- | --- | --- | --- |
| Public User Identity (See 7.2) | Public-Identity | M | This information element contains the public identity of the user |
| Private User Identity (See 7.3) | User-Name | M | This information element contains the user private identity |
| Number Authentication Items (See 7.10) | SIP-Number-Auth-Items | M | This information element indicates the number of authentication vectors requested |
| Authentication Data (See 7.9) | SIP-Auth-Data-Item | M | See Tables 6.3.2 and 6.3.3 for the contents of this information element. The content shown in table 6.3.2 shall be used for a normal authentication request; the content shown in table 6.3.3 shall be used for an authentication request after synchronization failure. |
| S-CSCF Name (See 7.4) | Server-Name | M | This information element contains the name (SIP URL) of the S-CSCF. |
| Routing Information (See 7.13) | Destination-Host | C | If the S-CSCF knows the HSS name this AVP shall be present. This information is available if the MAR belongs to an already existing registration, e.g. in case of the re-registration, where the HSS name is stored in the S-CSCF. The HSS name is obtained from the Origin-Host AVP, which is received from the HSS, e.g. included in the MAA command. This information may not be available if the command is sent in case of the initial registration. In this case the Destination-Host AVP |

TABLE 6.3.1-continued

Authentication request

| Information element name | Mapping to Diameter AVP | Cat. | Description |
|---|---|---|---|
| | | | is not present and the command is routed to the next Diameter node, e.g. SLF, based on the Diameter routing table in the client. |

TABLE 6.3.2

Authentication Data content—request

| Information element name | Mapping to Diameter AVP | Cat. | Description |
|---|---|---|---|
| Authentication Scheme (See 7.9.2) | SIP-Authentication-Scheme | M | This information element indicates the authentication scheme. It shall contain "Digest-AKAv1-MD5". |

TABLE 6.3.3

Authentication Data content—request, synchronization failure

| Information element name | Mapping to Diameter AVP | Cat. | Description |
|---|---|---|---|
| Authentication Scheme (See 7.9.2) | SIP-Authentication-Scheme | M | Authentication scheme. It shall contain "Digest-AKAv1-MD5". |
| Authorization Information (See 7.9.4) | SIP-Authorization | M | It shall contain the concatenation of nonce, as sent to the terminal, and auts, as received from the terminal. Nonce and auts shall both be binary encoded. |

TABLE 6.3.4

Authentication answer

| Information element name | Mapping to Diameter AVP | Cat. | Description |
|---|---|---|---|
| User Identity (See 7.2) | Public-Identity | C | User public identity. It shall be present when the result is DIAMETER_SUCCESS. |
| Private User Identity (See 7.3) | User-Name | C | User private identity. It shall be present when the result is DIAMETER_SUCCESS. |
| Number Authentication Items (See 7.10) | SIP-Number-Auth-Items | C | This AVP indicates the number of authentication vectors delivered in the Authentication Data information element. It shall be present when the result is DIAMETER_SUCCESS. |
| Authentication Data (See 7.9) | SIP-Auth-Data-Item | C | If the SIP-Number-Auth-Items AVP is equal to zero or it is not present, then this AVP shall not be present. See Table |

TABLE 6.3.4-continued

Authentication answer

| Information element name | Mapping to Diameter AVP | Cat. | Description |
|---|---|---|---|
| | | | 6.3.5 for the contents of this information element. |
| Result (See 7.6) | Result-Code/Experimental-Result | M | Result of the operation. Result-Code AVP shall be used for errors defined in the Diameter Base Protocol. Experimental-Result AVP shall be used for Cx/Dx errors. This is a grouped AVP which contains the 3GPP Vendor ID in the Vendor-Id AVP, and the error code in the Experimental-Result-Code AVP. |
| Associated Private Identities | Associated-Identities | C | This AVP contains the private user identities, which belong to the same IMS subscription as the private user identity received in the MAR command. If the IMS subscription contains only single private user identity, this AVP shall not be present. |

TABLE 6.3.5

Authentication Data content—response

| Information element name | Mapping to Diameter AVP | Cat. | Description |
|---|---|---|---|
| Item Number (See 7.9.1) | SIP-Item-Number | C | This information element shall be present in a SIP-Auth-Data-Item grouped AVP in circumstances where there are multiple occurrences of SIP-Auth-Data-Item AVPs, and the order in which they should be processed is significant. In this scenario, SIP-Auth-Data-Item AVPs with a low SIP-Item-Number value should be processed before SIP-Auth-Data-Items AVPs with a high SIP-Item-Number value. |
| Authentication Scheme (See 7.9.2) | SIP-Authentication-Scheme | M | Authentication scheme. It shall contain "Digest-AKAv1-MD5". |
| Authentication Information (See 7.9.3) | SIP-Authenticate | M | It shall contain, binary encoded, the concatenation of the authentication challenge RAND and the token AUTN. See 3GPP TS 33.203 [3] for further details about RAND and AUTN. |
| Authorization Information (See 7.9.4) | SIP-Authorization | M | It shall contain binary encoded, the expected response XRES. See 3GPP TS 33.203 [3] for further details about XRES. |
| Confidentiality Key (See 7.9.5) | Confidentiality-Key | O | This information element, if present, shall contain the confidentiality key. It shall be binary encoded. |
| Integrity Key (See 7.9.6) | Integrity-Key | M | This information element shall contain the integrity key. It shall be binary encoded. |

Detailed Behaviour

The HSS shall, in the following order (in case of an error in any of the steps the HSS shall stop processing and return the corresponding error code, see 3GPP TS 29.229 [5]):

1. Check that the user exists in the HSS. If not Experimental-Result-Code shall be set to DIAMETER_ERROR_USER_UNKNOWN.
2. The HSS may check that the private and public identities belong to the same user. If not Experimental-Result-Code shall be set to DIAMETER_ERROR_IDENTITIES_DONT_MATCH.
3. Check that the authentication scheme indicated in the request is supported. If not Experimental-Result-Code shall be set to DIAMETER_ERROR_AUTH_SCHEME_UNSUPPORTED.
4. If the request indicates there is a synchronization failure, the HSS shall compare the S-CSCF name received in the request to the S-CSCF name stored in the HSS:
    If they are identical the HSS shall process AUTS as described in 3GPP TS 33.203 [3] and return the requested authentication information. The Result-Code shall be set to DIAMETER_SUCCESS.
5. Check the registration status of the public identity received in the request:
    If it is registered, the HSS shall compare the S-CSCF name received in the request to the S-CSCF name stored in the HSS:
        If they are different, the HSS shall store the S-CSCF name. The HSS shall download Authentication-Data-Item stored up to a maximum specified in SIP-Number-Auth-Items received in the command Multimedia-Auth-Request. The HSS shall set the public identity's authentication pending flag which is specific to the private identity which was received in the request. The Result-Code shall be set to DIAMETER_SUCCESS.
        If they are identical, the HSS shall download Authentication-Data-Item stored up to a maximum specified in SIP-Number-Auth-Items received in the command Multimedia-Auth-Request. The Result-Code shall be set to DIAMETER_SUCCESS.
    If it is unregistered (i.e. registered as a consequence of a terminating call to unregistered user or there is an S-CSCF keeping the user profile stored), the HSS shall compare the S-CSCF name received in the request to the S-CSCF name stored in the HSS:
        If they are different, the HSS shall store the S-CSCF name. The HSS shall download Authentication-Data-Item stored up to a maximum specified in SIP-Number-Auth-Items received in the command Multimedia-Auth-Request. The HSS shall set the public identity's authentication pending flag which is specific to the private identity which was received in the request. The Result-Code shall be set to DIAMETER_SUCCESS.
        If they are identical, the HSS shall download Authentication-Data-Item stored up to a maximum specified in SIP-Number-Auth-Items received in the command Multimedia-Auth-Request. The HSS shall set the public identity's authentication pending flag which is specific to the private identity that was received in the request. The Result-Code shall be set to DIAMETER_SUCCESS.
    If it is not registered, the HSS shall store the S-CSCF name. The HSS shall download Authentication-Data-Item stored up to a maximum specified in SIP-Number-Auth-Items received in the command Multimedia-Auth-Request. The HSS shall set the public identity's authentication pending flag which is specific to the private identity that was received in the request. The Result-Code shall be set to DIAMETER_SUCCESS.
6. If there are multiple private user identities, which belong to the served IMS subscription, the Associated-Identities AVP shall be added to the answer message and it shall contain all private user identities associated to the IMS subscription.

Exceptions to the cases specified here shall be treated by HSS as error situations, the Result-Code shall be set to DIAMETER_UNABLE_TO_COMPLY. No authentication information shall be returned.

This associated private identities information element indicates to the S-CSCF the private user identities, which belong to the same IMS subscription. See 3GPP TS 29.229 [5].

The following is a description of the Server-Assignment-Answer (SAA) Command suitable for implementing the features described above in the 3GPP system.

The Server-Assignment-Answer (SAA) command, indicated by the Command-Code field set to 301 and the 'R' bit cleared in the Command Flags field, is sent by a server in response to the Server-Assignment-Request command. The Result-Code or Experimental-Result AVP may contain one of the values defined in section 6.2 in addition to the values defined in IETF RFC 3588 [6]. If Result-Code or Experimental-Result does not inform about an error, the User-Data AVP shall contain the information that the S-CSCF needs to give service to the user.

Message Format
<Server-Assignment-Answer> ::= < Diameter Header: 301, PXY, 16777216 >
    < Session-Id >
    { Vendor-Specific-Application-Id }
    [ Result-Code ]
    [Experimental-Result ]
    { Auth-Session-State }
    { Origin-Host }
    { Origin-Realm }
    [ User-Name ]
    *[ Supported-Features ]
    [ User-Data ]
    [ Charging-Information ]
    [ Associated-Identities ]
    *[ AVP ]
    *[ Proxy-Info ]
    *[ Route-Record ]

The following is a description of the Multimedia-Auth-Answer (MAA) Command suitable for implementing the features described above in the 3GPP system.

The Multimedia-Auth-Answer (MAA) command, indicated by the Command-Code field set to 303 and the 'R' bit cleared in the Command Flags field, is sent by a server in response to the Multimedia-Auth-Request command. The Result-Code or Experimental-Result AVP may contain one of the values defined in section 6.2 in addition to the values defined in IETF RFC 3588 [6].

Message Format
    < Multimedia-Auth-Answer > ::= < Diameter Header: 303, PXY, 16777216 >
        < Session-Id >

-continued
```
{ Vendor-Specific-Application-Id }
[ Result-Code ]
[ Experimental-Result ]
{ Auth-Session-State }
{ Origin-Host }
{ Origin-Realm }
[ User-Name ]
*[ Supported-Features ]
[ Public-Identity ]
[ SIP-Number-Auth-Items ]
* [ SIP-Auth-Data-Item ]
[ Associated-Identities ]
* [ AVP ]
```

-continued
```
* [ Proxy-Info ]
* [ Route-Record ]
```

The following is a description of the AVPs suitable for implementing the features described above in the 3GPP system in conjunction with other features of the system.

The following table describes the Diameter AVPs defined for the Cx interface protocol, their AVP Code values, types, possible flag values and whether or not the AVP may be encrypted. The Vendor-Id header of all AVPs defined in this specification shall be set to 3GPP (10415).

TABLE 6.3.1

Diameter Multimedia Application AVPs

| Attribute Name | AVP Code | Section defined | Value Type | AVP Flag rules | | | | |
|---|---|---|---|---|---|---|---|---|
| | | | | Must | May | Should not | Must not | May Encr. |
| Visited-Network-Identifier | 600 | 6.3.1 | OctetString | M, V | | | | No |
| Public-Identity | 601 | 6.3.2 | UTF8String | M, V | | | | N |
| Server-Name | 602 | 6.3.3 | UTF8String | M, V | | | | No |
| Server-Capabilities | 603 | 6.3.4 | Grouped | M, V | | | | No |
| Mandatory-Capability | 604 | 6.3.5 | Unsigned32 | M, V | | | | No |
| Optional-Capability | 605 | 6.3.6 | Unsigned32 | M, V | | | | No |
| User-Data | 606 | 6.3.7 | OctetString | M, V | | | | No |
| SIP-Number-Auth-Items | 607 | 6.3.8 | Unsigned32 | M, V | | | | No |
| SIP-Authentication-Scheme | 608 | 6.3.9 | UTF8String | M, V | | | | No |
| SIP-Authenticate | 609 | 6.3.10 | OctetString | M, V | | | | No |
| SIP-Authorization | 610 | 6.3.11 | OctetString | M, V | | | | No |
| SIP-Authentication-Context | 611 | 6.3.12 | OctetString | M, V | | | | No |
| SIP-Auth-Data-Item | 612 | 6.3.13 | Grouped | M, V | | | | No |
| SIP-Item-Number | 613 | 6.3.14 | Unsigned32 | M, V | | | | No |
| Server-Assignment-Type | 614 | 6.3.15 | Enumerated | M, V | | | | No |
| Deregistration-Reason | 615 | 6.3.16 | Grouped | M, V | | | | No |
| Reason-Code | 616 | 6.3.17 | Enumerated | M, V | | | | No |
| Reason-Info | 617 | 6.3.18 | UTF8String | M, V | | | | No |
| Charging-Information | 618 | 6.3.19 | Grouped | M, V | | | | No |
| Primary-Event-Charging-Function-Name | 619 | 6.3.20 | DiameterURI | M, V | | | | No |
| Secondary-Event-Charging-Function-Name | 620 | 6.3.21 | DiameterURI | M, V | | | | No |
| Primary-Charging-Collection-Function-Name | 621 | 6.3.22 | DiameterURI | M, V | | | | No |
| Secondary-Charging-Collection-Function-Name | 622 | 6.3.23 | DiameterURI | M, V | | | | No |
| User-Authorization-Type | 623 | 6.3.24 | Enumerated | M, V | | | | No |
| User-Data-Already-Available | 624 | 6.3.26 | Enumerated | M, V | | | | No |
| Confidentiality-Key | 625 | 6.3.27 | OctetString | M, V | | | | No |
| Integrity-Key | 626 | 6.3.28 | OctetString | M, V | | | | No |
| User-Data-Request-Type | 627 | 6.3.25 | Enumerated | M, V | | | | No |
| Supported-Features | 628 | 6.3.29 | Grouped | V | M | | | No |
| Feature-List-ID | 629 | 6.3.30 | Unsigned32 | V | | | M | No |
| Feature-List | 630 | 6.3.31 | Unsigned32 | V | | | M | No |

TABLE 6.3.1-continued

Diameter Multimedia Application AVPs

| | | | | | | AVP Flag rules | | |
| --- | --- | --- | --- | --- | --- | --- | --- | --- |
| Attribute Name | AVP Code | Section defined | Value Type | Must | May | Should not | Must not | May Encr. |
| Supported-Applications | 631 | 6.3.32 | Grouped | V | | | M | No |
| Associated-Identities | 632 | 6.3.33 | Grouped | M, V | | | | No |

NOTE 1:
The AVP header bit denoted as 'M', indicates whether support of the AVP is required. The AVP header bit denoted as 'V', indicates whether the optional Vendor-ID field is present in the AVP header. For further details, see IETF RFC 3588 [6].
NOTE 2:
Depending on the concrete command.

The Associated-Identities AVP is of type Grouped and it contains the private user identities associated to an IMS subscription.

```
AVP format
    Associated-Identities ::= <AVP header: 632 10415>
                              *[User-Name]
                              *[AVP]
```

The present invention is applicable in systems other than the present 3G communications system. In principle, the ability to inform a service-providing entity (e.g. an S-CSCF) of multiple parings of public and private user identities is useful in a wide range of systems. It is particularly advantageous to achieve this by means of the same message as is used to inform the service-providing entity of information regarding a primary identity pair (e.g. a SAR message and/or a PPR message). Correspondingly, it is also advantageous to be able to trigger the deletion of multiple parings through a single message (e.g. an RTR message).

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method, comprising:
transmitting a first message including data specifying characteristics of a pairing of a first private user identity and a public user identity, the first message including information identifying any further private user identities other than the first private user identity that are associated with a same subscription as the first private user identity, wherein
a private user identity characteristic is paired with a public user identity characteristic and more than one private user identity is associated with a subscription.

2. A method as claimed in claim 1, wherein the characteristics of the pairing of the first private user identity and the public user identity include at least one of: a session authorization state, an origin host, an origin realm, a user name, and information specifying a charging regime to be applied to the pairing.

3. A method as claimed in claim 2, further comprising:
transmitting the first message in response to a second message from a service provision entity requesting information on the pairing.

4. A method as claimed in claim 3, wherein the transmitting is performed in a universal mobile telecommunications system or a derivative thereof and the first message comprises a multimedia-auth-answer or a server-assignment-answer message.

5. A method as claimed in claim 2, further comprising:
transmitting the first message in response to an addition to a subscription of a private user identity.

6. A method as claimed in claim 5, wherein the transmitting is performed in a universal mobile telecommunications system or a derivative thereof and the first message comprises a push-profile-request message.

7. A method as claimed in claim 1, wherein the transmitting is performed in a universal mobile telecommunications system or a derivative thereof, and the first message is transmitted from a subscription information store entity comprising a home subscriber server.

8. A method as claimed in claim 1, wherein the transmitting is performed in a universal mobile telecommunications system or a derivative thereof, and the first message is received by a service provision entity comprising a serving call session control function.

9. An apparatus, comprising:
a transmitter configured to transmit a first message including data specifying characteristics of a pairing of a first private user identity and a public user identity, the message including information identifying any further private user identities other than the first private user identity that are associated with a same subscription as the first private user identity, wherein
a private user identity characteristic is paired with a public user identity characteristic and more than one private user identity is associated with a subscription.

10. An apparatus as claimed in claim 9, wherein the characteristics of the pairing of the first private user identity and the public user identity include at least one of: a session authorization state, an origin host, an origin realm, a user name, and information that specifies a charging regime to be applied to the pairing.

11. An apparatus as claimed in claim 10, wherein the transmitter is further configured to transmit the first message in response to a second message from a service provision entity requesting information on the pairing.

12. An apparatus as claimed in claim 11, wherein the first message comprises a multimedia-auth-answer or a server-assignment-answer message.

13. An apparatus as claimed in claim 10, wherein the transmitter is further configured to transmit the first message in response to an addition to a subscription of a private user identity.

14. An apparatus as claimed in claim 13, wherein the first message comprises a push-profile-request message.

15. An apparatus as claimed in claim 9, wherein the apparatus comprises a home subscriber server.

16. An apparatus as claimed in claim 9, wherein the transmitter is configured to transmit the first message to a service provision entity comprising a serving call session control function.

17. An apparatus, comprising:
a receiver configured to receive a first message including data specifying characteristics of a pairing of a first private user identity and a public user identity, the first message including information identifying any further private user identities other than the first private user identity that are associated with a same subscription as the first private user identity to store a record for the subscription that includes an indication of the further private user entities, wherein
a private user identity characteristic is paired with a public user identity characteristic and more than one private user identity is associated with a subscription.

18. An apparatus as claimed in claim 17, wherein the characteristics of the pairing of the first private user identity and the public user identity include at least one of: a session authorization state, an origin host, an origin realm, a user name, and information specifying a charging regime to be applied to the pairing.

19. An apparatus as claimed in claim 17, wherein the first message comprises a multimedia-auth-answer or a server-assignment-answer message.

20. An apparatus as claimed in claim 17, wherein the first message comprises a push-profile-request message.

21. An apparatus, comprising:
receiving means for receiving a first message including data specifying characteristics of a pairing of a first private user identity and a public user identity, the first message including information identifying any further private user identities other than the first private user identity that are associated with a same subscription as the first private user identity to store a record for the subscription that includes an indication of the further private user entities, wherein
a private user identity characteristic is paired with a public user identity characteristic and more than one private user identity is associated with a subscription.

22. A method, comprising:
receiving a first message including data specifying characteristics of a pairing of a first private user identity and a public user identity, the first message including information identifying any further private user identities other than the first private user identity that are associated with a same subscription as the first private user identity to store a record for the subscription that includes an indication of the further private user entities, wherein
a private user identity characteristic is paired with a public user identity characteristic and more than one private user identity is associated with a subscription.

23. A method as claimed in claim 22, wherein the characteristics of the pairing of the first private user identity and the public user identity include at least one of: a session authorization state, an origin host, an origin realm, a user name, and information specifying a charging regime to be applied to the pairing.

24. A method as claimed in claim 22, wherein the first message comprises a multimedia-auth-answer or a server-assignment-answer message.

25. A method as claimed in claim 22, wherein the first message comprises a push-profile-request message.

26. A computer program embodied on a computer-readable storage medium, the program configured to control a processor to perform a process, the process comprising:
transmitting a first message including data specifying characteristics of a pairing of a first private user identity and a public user identity, the first message including information identifying any further private user identities other than the first private user identity that are associated with a same subscription as the first private user identity; and
pairing a private user identity characteristic with a public user identity characteristic and associating more than one private user identity with a subscription.

27. A computer program as claimed in claim 26, wherein the characteristics of the pairing of the first private user identity and the public user identity include at least one of: a session authorization state, an origin host, an origin realm, a user name, and information specifying a charging regime to be applied to the pairing.

28. A computer program as claimed in claim 27, the process further comprising:
transmitting the first message in response to a second message from a service provision entity requesting information on the pairing.

29. A computer program embodied on a computer-readable storage medium, the program configured to control a processor to perform a process, the process comprising:
receiving a first message including data specifying characteristics of a pairing of a first private user identity and a public user identity, the first message including information identifying any further private user identities other than the first private user identity that are associated with a same subscription as the first private user identity to store a record for the subscription that includes an indication of the further private user entities, wherein
a private user identity characteristic is paired with a public user identity characteristic and more than one private user identity is associated with a subscription.

30. A computer program as claimed in claim 29, wherein the characteristics of the pairing of the first private user identity and the public user identity include at least one of: a session authorization state, an origin host, an origin realm, a user name, and information specifying a charging regime to be applied to the pairing.

* * * * *